United States Patent
Eo et al.

(10) Patent No.: US 10,576,816 B2
(45) Date of Patent: Mar. 3, 2020

(54) TRANSMISSION FOR ELECTRIC VEHICLES

(71) Applicants: Hyundai Motor Company, Seoul (KR); Kia Motors Corporation, Seoul (KR)

(72) Inventors: Soon Ki Eo, Ansan-si (KR); Seong Wook Hwang, Gunpo-si (KR); Chon Ok Kim, Yongin-si (KR); Il Han Yoo, Hwasun-gun (KR); Jong Yun Park, Hwaseong-si (KR); Seong Wook Ji, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 137 days.

(21) Appl. No.: 15/916,545

(22) Filed: Mar. 9, 2018

(65) Prior Publication Data
US 2019/0152311 A1    May 23, 2019

(30) Foreign Application Priority Data

Nov. 21, 2017 (KR) .................. 10-2017-0155527

(51) Int. Cl.
*B60K 1/02* (2006.01)
*B60K 6/54* (2007.10)
(Continued)

(52) U.S. Cl.
CPC .............. *B60K 6/54* (2013.01); *B60K 1/02* (2013.01); *B60K 6/365* (2013.01); *B60K 6/383* (2013.01);
(Continued)

(58) Field of Classification Search
CPC ... B60K 6/54; B60K 1/02; B60K 6/44; B60K 6/383; B60K 6/365; F16H 37/065;
(Continued)

(56) References Cited

U.S. PATENT DOCUMENTS

| | | | |
|---|---|---|---|
| 2002/0084118 A1* | 7/2002 | Esaki | B60K 6/40 180/65.25 |
| 2019/0118638 A1* | 4/2019 | Hummel | B60K 6/383 |
| 2019/0162272 A1* | 5/2019 | Eo | B60K 6/547 |

FOREIGN PATENT DOCUMENTS

| | | | | |
|---|---|---|---|---|
| JP | 2004034727 A | * | 2/2004 | ............. B60K 6/383 |
| KR | 10-2013-0115618 A | | 10/2013 | |
| WO | WO-2019159604 A1 | * | 8/2019 | ............. B60K 6/365 |

OTHER PUBLICATIONS

KR2019066420A (Year: 2019).*

* cited by examiner

*Primary Examiner* — Roger L Pang
(74) *Attorney, Agent, or Firm* — Morgan, Lewis & Bockius LLP

(57) ABSTRACT

A transmission for electric vehicles may include a first input shaft receiving a rotational force from a first motor; a second input shaft receiving a rotational force from a second motor; a one-way clutch mounted between the first and second input shafts, transferring only a forward rotation of the first input shaft to the second input shaft, and transferring only a reverse rotation of the second input shaft to the first input shaft; an output shaft disposed in parallel to the first and second shafts; a gear shifting device coupled to the first input shaft and the output shaft and coupled to the second input shaft and the output shaft, wherein the gear pairs have different shift ratios, and a gear pair corresponding to a driving speed is selected by a clutch device; and an idler gear coupled between gears coupled to the second input shaft and the output shaft.

13 Claims, 16 Drawing Sheets

(51) Int. Cl.
B60K 6/365 (2007.10)
B60K 6/383 (2007.10)
B60K 6/44 (2007.10)
F16H 3/72 (2006.01)
F16H 37/06 (2006.01)
F16H 3/089 (2006.01)
F16H 3/08 (2006.01)
F16H 3/10 (2006.01)

(52) U.S. Cl.
CPC ............... B60K 6/44 (2013.01); F16H 3/728 (2013.01); F16H 37/065 (2013.01); B60Y 2400/73 (2013.01); F16H 3/089 (2013.01); F16H 3/10 (2013.01); F16H 2003/0822 (2013.01); F16H 2200/0039 (2013.01); F16H 2200/201 (2013.01); F16H 2200/2038 (2013.01)

(58) Field of Classification Search
CPC .... F16H 3/728; F16H 2200/0039; F16H 3/10; F16H 3/089
USPC ........................ 74/329, 330; 475/5; 180/65.7
See application file for complete search history.

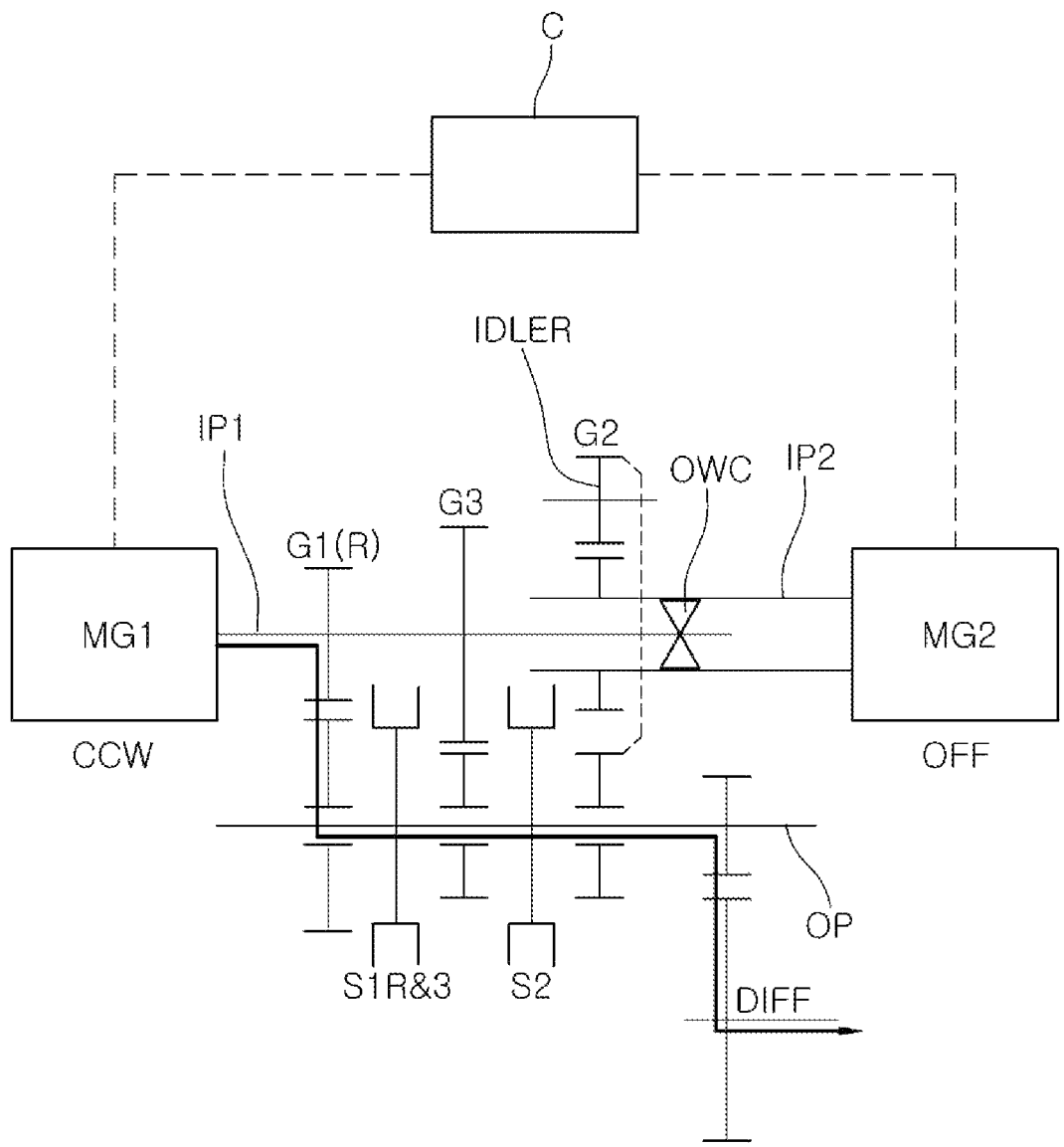

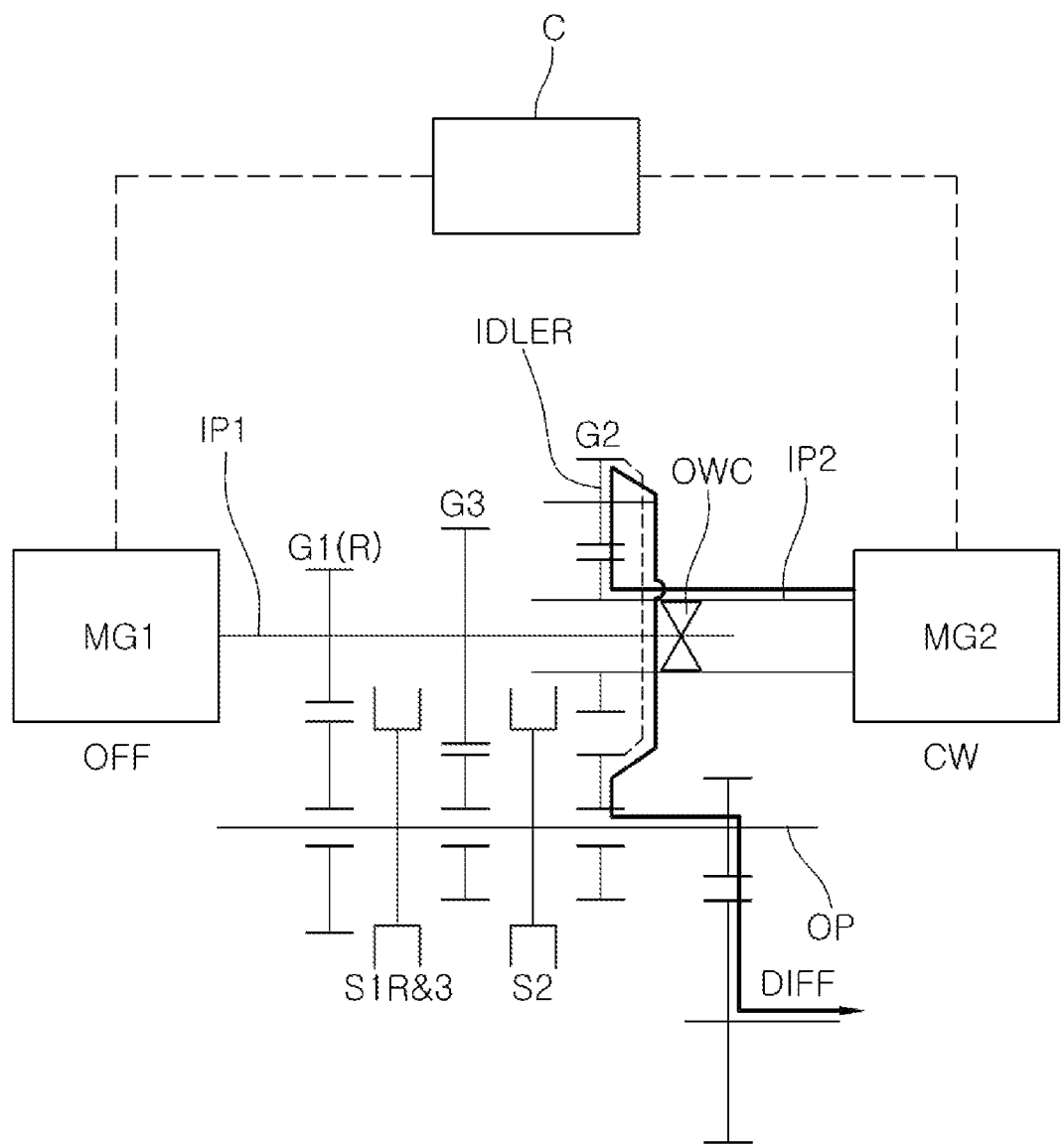

| STAGE | S1R&3 | | | S2 | | MG1 | MG2 |
|---|---|---|---|---|---|---|---|
| | 1 (R) | N | 3 | 2 | N | | |
| 1st Sp. | O | X | X | X | O | CCW | CCW |
| 2nd Sp. | X | O | X | O | X | CW | CW |
| 3rd Sp. | X | X | O | X | O | CCW | CCW |
| Reverse | (O) | X | X | O | X | CW | CCW |

TRANSMISSION FOR ELECTRIC VEHICLES

CROSS REFERENCE TO RELATED APPLICATION

The present application claims priority to Korean Patent Application No. 10-2017-0155527, filed Nov. 21, 2017, the entire contents of which is incorporated herein for all purposes by this reference.

BACKGROUND OF THE INVENTION

Field of the Invention

The present invention relates to a transmission for electrical vehicles, which is configured for removing a shifting interruption feel using the characteristics of bidirectionally rotatable electric motors, without adding a separate device.

Description of Related Art

An automated manual transmission provides driving convenience similar to an automatic transmission, because gear shifting is automatically performed by an actuator while a vehicle is driven. Furthermore, the automated manual transmission has better power transmission efficiency than the automatic transmission, contributing to improving the fuel efficiency of the vehicle.

In an automated manual transmission based on a synchromesh type gear shifting mechanism, however, the moment that engine power is cut off is inevitably present even while gear shifting is automatically performed by an actuator. Thus, a gear shifting feel may be degraded while a driver feels as if the vehicle is pulled backward, due to a torque reduction caused by the cut-off of the engine power.

When a multi-speed transmission is applied as a transmission for electrical vehicles instead of a conventional single-speed transmission (decelerator), a motor torque can be reduced. Thus, the optimal efficiency point of the motor based on the multi-stage transmission can be utilized to improve power consumption.

However, since the multi-speed transmission may include more components than the single-speed transmission, the cost and weight may be increased. Furthermore, the multi-stage transmission has many restrictions due to the addition of the structure and control device configured for removing a torque interruption feel during gear shifting, which makes it difficult to just employ a conventional transmission for internal combustion engines in electrical vehicles.

Therefore, there is a demand for a transmission for electrical vehicles, which has a simple structure and is appropriate in terms of cost.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a transmission for electrical vehicles, which is configured for removing a shifting interruption feel using the characteristics of bidirectionally rotatable electric motors, without adding a separate device.

According to one aspect, there is provided a transmission for electric vehicles, including: a first input shaft receiving a rotational force from a first motor; a second input shaft receiving a rotational force from a second motor; a one-way clutch disposed between the first and second input shafts, transferring only a forward rotation of the first input shaft to the second input shaft, and transferring only a reverse rotation of the second input shaft to the first input shaft; an output shaft disposed in parallel to the first and second shafts; a gear shifting device having a gear pair coupled to the first input shaft and the output shaft and a gear pair coupled to the second input shaft and the output shaft, wherein the gear pairs have different shift ratios, and a gear pair corresponding to a driving speed is selected by a clutch device; and an idler gear engaged and coupled between gears coupled to the second input shaft and the output shaft.

A first motor may be directly connected to one end portion of the first input shaft, a second motor may be directly connected to one end portion of the second input shaft, the one-way clutch may be disposed between the other end portion of the first input shaft and the other end portion of the second input shaft, and the first and second input shafts may be disposed on the same axis.

The first input shaft may be formed as a solid shaft and the second input shaft may be formed as a hollow shaft, such that the first input shaft is inserted into the second input shaft.

Any one gear pair between an odd-numbered gear pair and an even-numbered gear pair may be engaged and coupled to the first input shaft and the output shaft, and the other gear pair which is not engaged with the first input shaft and the output shaft, between the odd-numbered gear pair and the even-numbered gear pair, may be coupled to the second input shaft and the output shaft.

A first-speed gear pair may be engaged and coupled to the first input shaft and the output shaft, and commonly used as a reverse-speed gear pair.

An integration gear may be disposed at the other end portion of the first input shaft, and a clutch device may be disposed at the other end portion of the second input shaft, and coupled to the integration gear.

The first-speed gear pair may be engaged and coupled to the first input shaft and the output shaft, a planetary gear device may be coaxially coupled to the first input shaft, and one rotation element among three rotation elements of the planetary gear device may be fixed to a first-speed driving gear, and increase a gear ratio to a higher ratio than a gear ratio of the first-speed gear pair.

The transmission may further include a controller configured to turn on/off the first and second motors and switch the rotation directions of the first and second motors to provide a rotational force, while a current driving speed is shifted to a target driving speed during forward operation of a vehicle.

The controller may be configured to control the first and second motors to be driven in the reverse direction or control the first motor to be driven in the reverse direction thereof, when the driving speed is formed by the gear pair coupled to the first input shaft and the output shaft, and control the first and second motors to be driven in the forward direction or control the second motor to be driven in the forward direction thereof, when the driving speed is formed by the gear pair coupled to the second input shaft and the output shaft.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2A, FIG. 2B, FIG. 2C, and FIG. 2D illustrates a gear shifting process from a first speed to a second speed using the transmission of FIG. 1 and a power flow during the gear shifting process;

Figure 1:
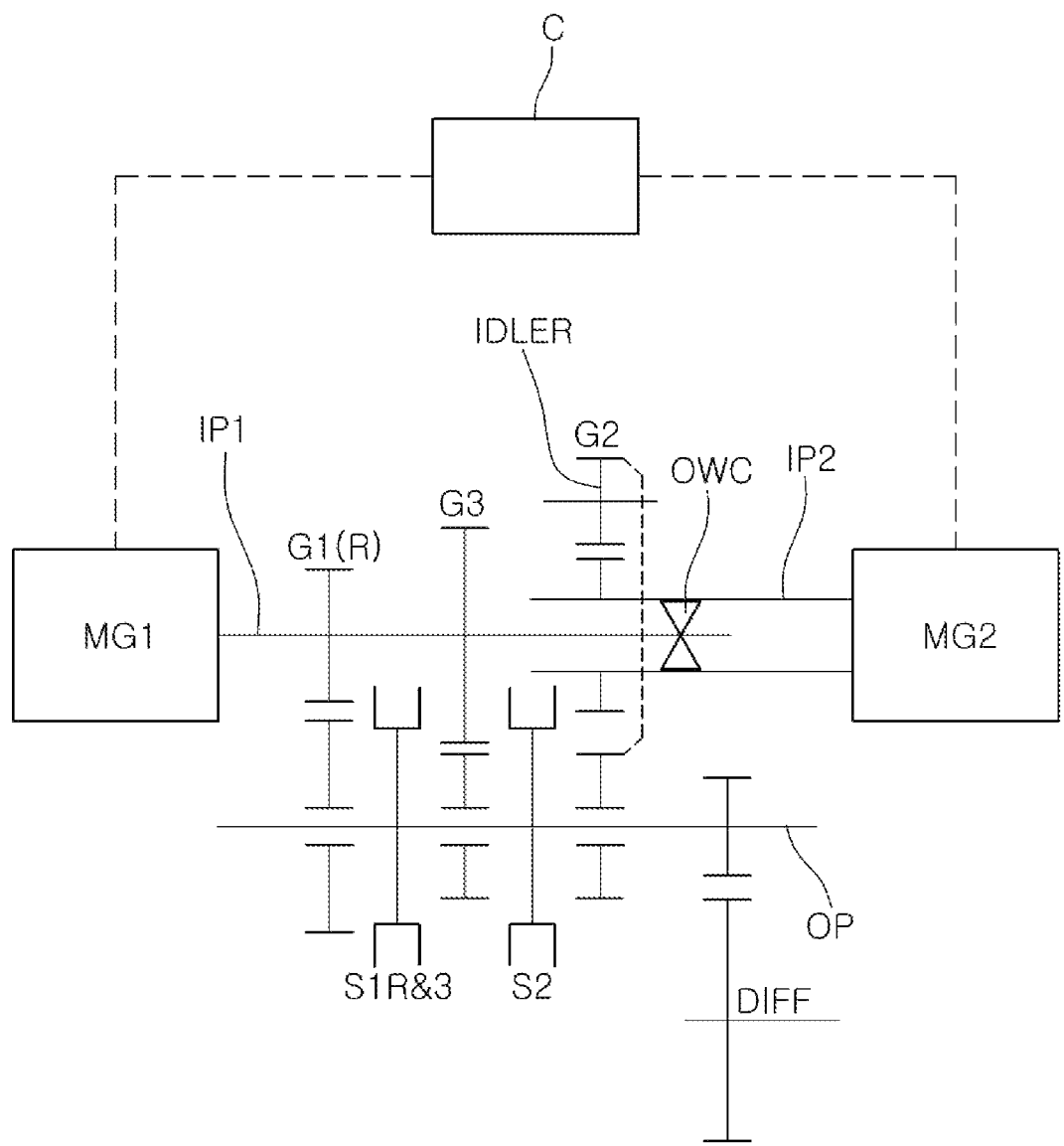
FIG. 1 is a representative structure of a transmission for electrical vehicles according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described with reference to the appended drawings.

A transmission for electric vehicles according to an exemplary embodiment of the present invention may include a first input shaft IP1, a second input shaft IP2, a one-way clutch OWC, an output shaft OP, a gear shifting device and an idler gear IDLER.

Referring to FIG. 1, the first input shaft IP1 may receive a rotational force from a first motor MG1, and the first motor MG1 may be directly connected to one end portion of the first input shaft IP1.

The second input shaft IP2 may receive a rotational force from a second motor MG2, and the second motor MG2 may be directly connected to one end portion of the second input shaft IP2.

For example, the first input shaft IP1 may be formed as a solid shaft and the second input shaft IP2 may be formed as a hollow shaft, such that the first input shaft IP1 is inserted into the second input shaft IP2. Such a structure can be checked with reference to a transmission structure illustrated in FIGS. 5 to 8 as well as FIG. 1.

Figure 11:
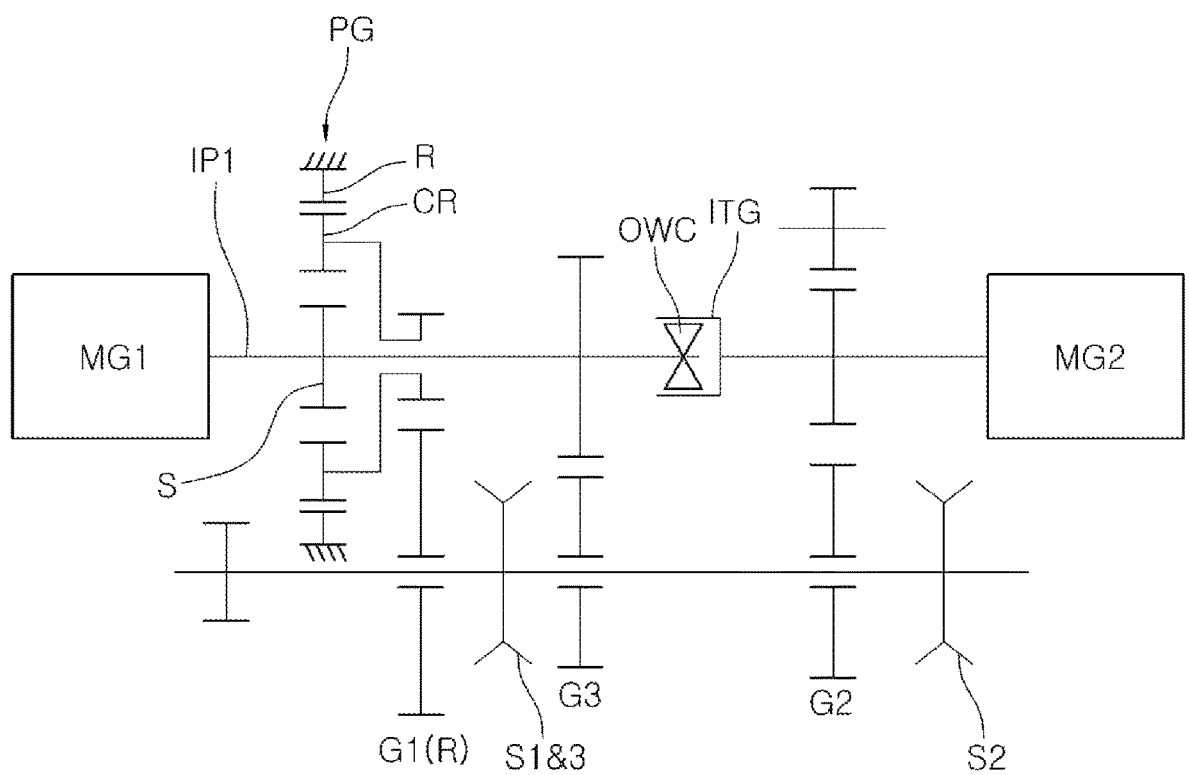
FIG. 11 and FIG. 12 illustrate the structure of a transmission which increases a reduction ratio of a first-speed gear ratio using a planetary gear device according to an exemplary embodiment of the present invention.
Figure 12:
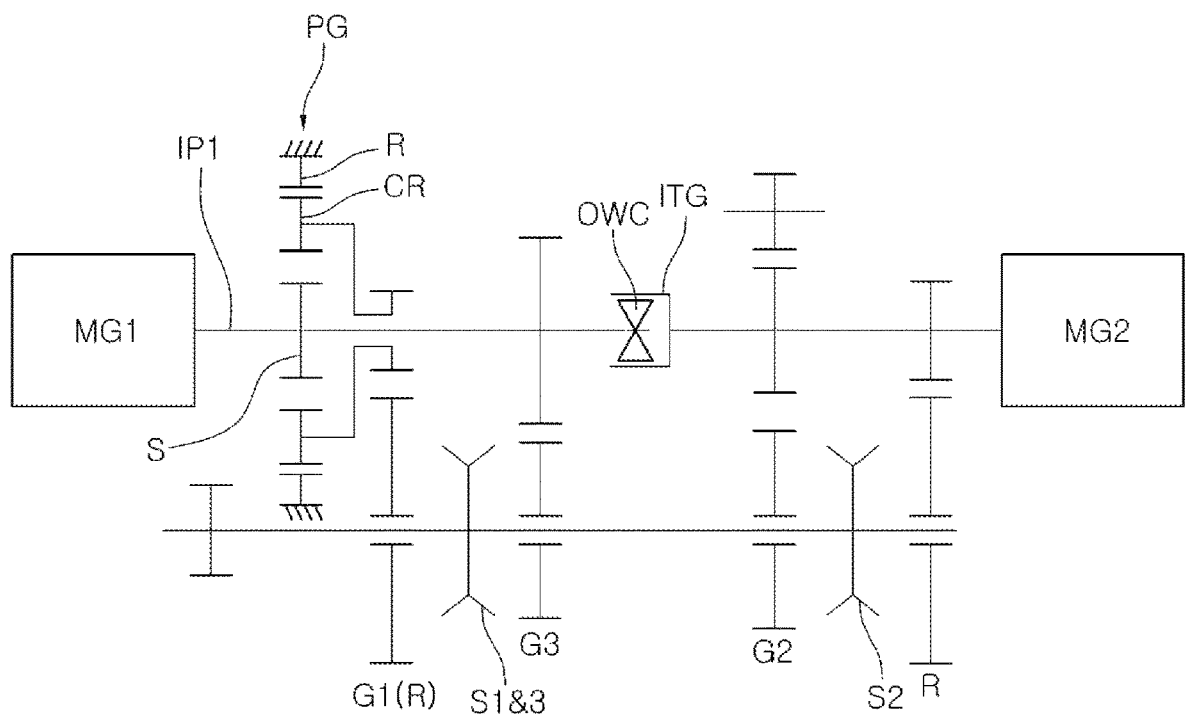

As illustrated in FIG. 11 and FIG. 12, however, the first and second input shafts IP1 and IP2 may be disposed such that the other end portion of the first input shaft IP1 faces the other end portion of the second input shaft IP2, and the one-way clutch OWC may be disposed between the first and second input shafts IP1 and IP2.

The one-way clutch OWC is disposed between the first and second input shafts IP1 and IP2, and configured to transfer only forward rotation of the first input shaft IP1 to the second input shaft IP2, and transfer only reverse rotation of the second input shaft IP2 to the first input shaft IP1.

Desirably, the one-way clutch OWC may be disposed between the other end portion of the first input shaft IP1 and the other end portion of the second input shaft IP2, and the first and second input shafts IP1 and IP2 may be disposed on the same axis such that the one-way clutch OWC controls the first and second input shafts IP1 to rotate relative to each other or restricts rotation.

For example, when the first motor MG1 is rotated in the forward (clockwise) direction thereof, the first input shaft IP1 is rotated in the forward direction thereof, and the second input shaft IP2 is also rotated in the forward direction by the one-way clutch OWC. On the other hand, when the first motor MG1 is rotated in the reverse (counterclockwise) direction thereof, the first input shaft IP1 is rotated in the reverse direction thereof, and the one-way clutch OWC restricts a rotational force from being transferred to the second input shaft IP2.

Furthermore, when the second motor MG2 is rotated in the reverse (counterclockwise) direction thereof, the second input shaft IP2 is rotated in the reverse direction thereof, and the first input shaft IP1 is also rotated in the reverse direction by the one-way clutch OWC. On the other hand, when the second motor MG2 is rotated in the forward (clockwise) direction thereof, the second input shaft IP2 is rotated in the forward direction thereof, and the one-way clutch OWC restricts a rotational force from being transferred to the first input shaft IP1.

Moreover, a two-way clutch, a friction clutch, an electromagnetic clutch, a synchro-mechanism, a latch, a dog clutch and the like may be used besides the one-way clutch OWC.

Figure 7:
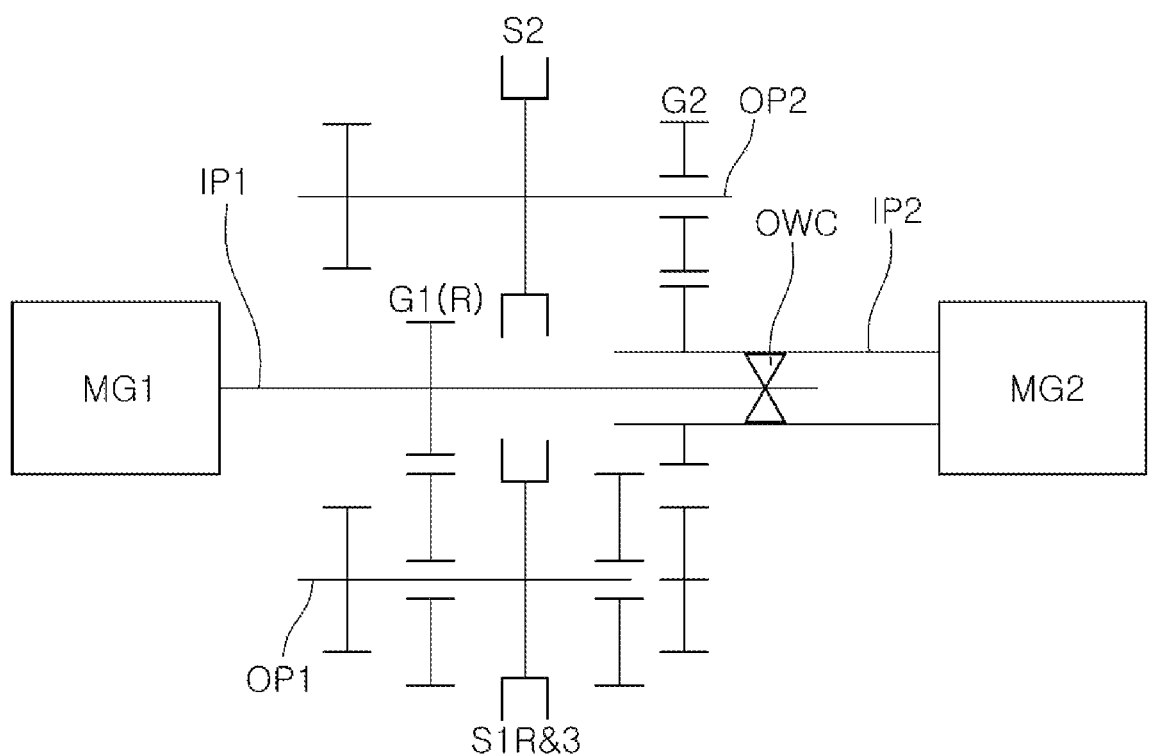
FIG. 7 illustrates the structure of a transmission having two output shafts according to an exemplary embodiment of the present invention.

The output shaft OP may be disposed in parallel to the first and second input shafts IP1 and IP2. As illustrated in FIG. 1, one output shaft OP may be disposed. In some cases, two output shafts OP may be disposed as illustrated in FIG. 7.

The gear shifting device may include a gear pair coupled to the first input shaft IP1 and the output shaft OP and a gear pair coupled to the second input shaft IP2 and the output shaft OP, and the gear pairs may have different shift ratios. According to a driving speed, a gear pair may be selected by a clutch device. The clutch device may include a synchromechanism.

The first input shaft IP1 and the output shaft OP may be engaged and coupled to any one gear pair between an odd-numbered gear pair and an even-numbered gear pair.

The second input shaft IP2 and the output shaft OP may be coupled to the other gear pair which is not engaged with the first input shaft IP1 and the output shaft OP, between the odd-numbered gear pair and the even-numbered gear pair.

For example, the odd-numbered gear pair may be engaged and coupled to the first input shaft IP1 and the output shaft OP, and the even-numbered gear pair may be coupled to the second input shaft IP2 and the output shaft OP.

The idler gear IDLER may be engaged and coupled between gears coupled to the second input shaft IP2 and the output shaft OP.

For example, when a second-speed gear pair is coupled to the second input shaft IP2 and the output shaft OP, the idler gear IDLER may be engaged and coupled between a second-speed driving gear and a second-speed driven gear, to switch a rotation direction thereof.

FIG. 1 illustrates a transmission structure for implementing three forward speeds according to an exemplary embodiment of the present invention, and a first-speed gear pair G1(R) and a third-speed gear pair G3 may be engaged with the first input shaft IP1 and the output shaft OP. At the present time, since the first-speed gear pair G1(R) can be commonly used as a reverse-speed gear pair, the reverse-speed gear pair may not be separately disposed.

Furthermore, a second-speed gear pair may be coupled to second input shaft IP2 and the output shaft OP.

At the present time, an idler shaft may be disposed in parallel to the second input shaft IP2 and the output shaft OP, and the idler gear IDLER may be disposed on the idler shaft, and engaged and coupled between a second-speed driving gear and a second-speed driven gear.

The output shaft OP may include a first (reverse) & third-speed clutch device S1R&3 configured for selecting a first (reverse)-speed driven gear and a third-gear driven gear, and a second-speed clutch device S2 configured for selecting a second-speed driven gear.

Figures 4, 5:
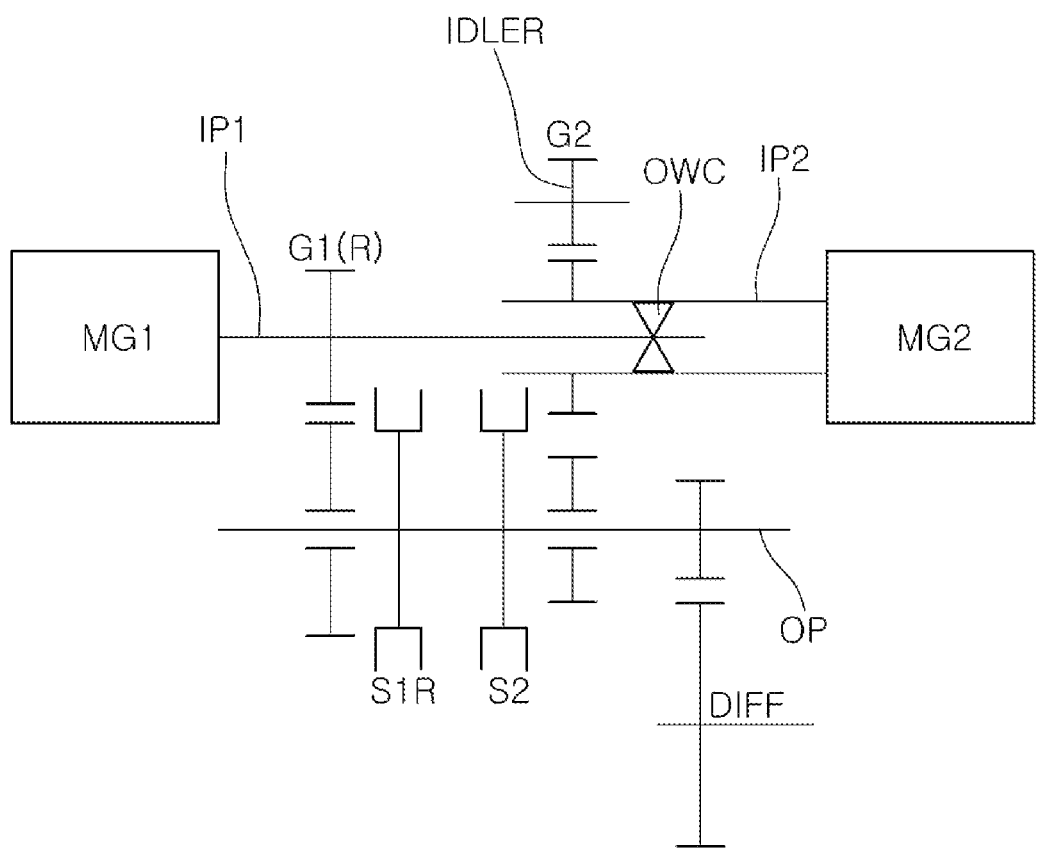
FIG. 4 illustrates a gear shifting operation table using the transmission of FIG. 1.
FIG. 5 illustrates the structure of a two-speed forward transmission according to an exemplary embodiment of the present invention.

FIG. 5 illustrates a transmission structure for implementing two forward speeds according to an exemplary embodiment of the present invention. The transmission structure of FIG. 5 may correspond to a structure constructed by removing the third-speed gear pair from the structure FIG. 1.

Figure 6:
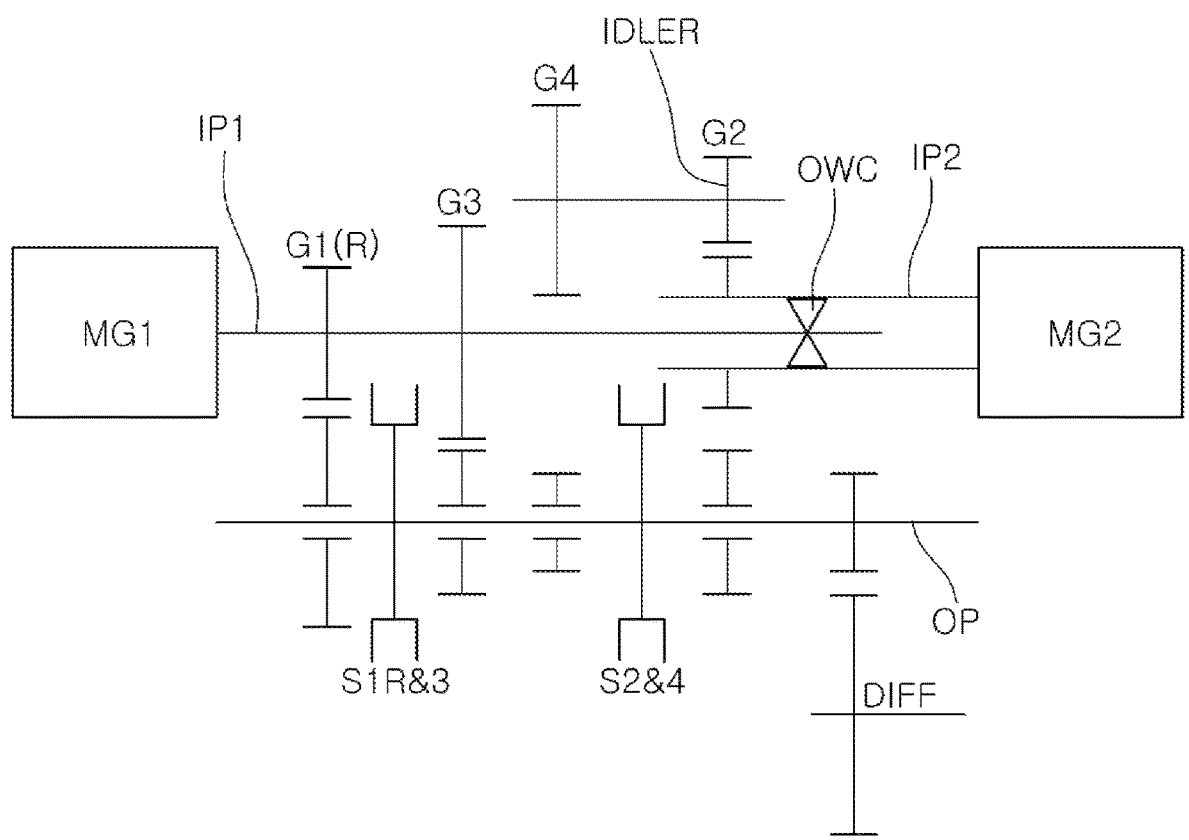
FIG. 6 illustrates the structure of a four-speed forward transmission according to an exemplary embodiment of the present invention.

FIG. 6 illustrates a transmission structure for implementing four forward speeds according to an exemplary embodiment of the present invention. The transmission structure of FIG. 6 may correspond to a structure constructed by adding a fourth-speed gear pair to the structure of FIG. 1.

That is, a fourth-speed gear pair may be coupled to the second input shaft IP2 and the output shaft OP, and an idler gear for the fourth speed may be disposed on the idler shaft, and engaged and coupled between a fourth-speed driving gear and a fourth-speed driven gear.

The output shaft OP may include a second & fourth-speed clutch device S2&4 configured for selecting the second-speed driven gear and the fourth-speed driven gear.

FIG. 7 illustrates a transmission structure in which the output shaft OP is divided into two shafts according to an exemplary embodiment of the present invention. Referring to FIG. 7, the first-speed gear pair G1(R) and the third-speed gear pair G3 may be engaged and coupled to the first input shaft IP1 and a first output shaft OP1, the second-speed gear pair G2 may be coupled to the second input shaft IP2 and a second output shaft OP2, and the idler gear IDLER may be engaged and coupled between the second-speed driving gear and the second-speed driven gear.

Figure 8:
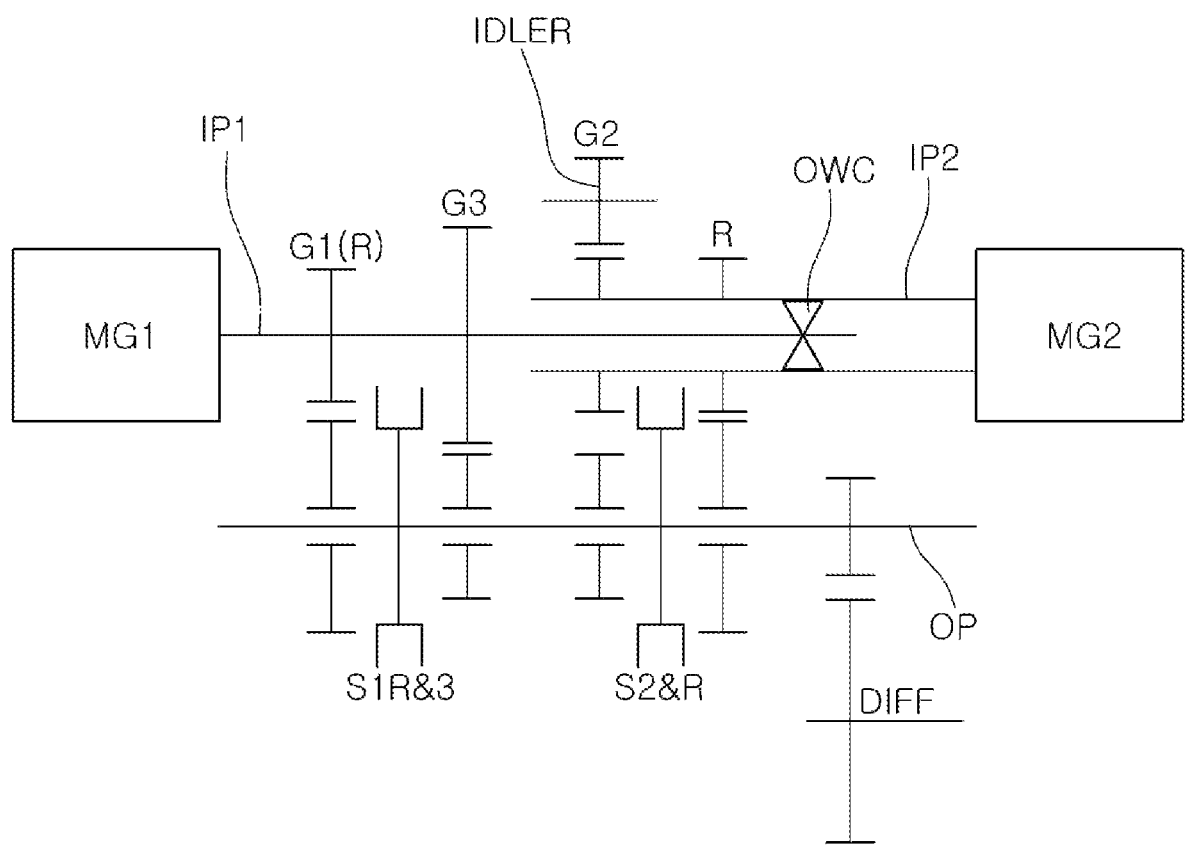
FIG. 8 illustrates the structure of a transmission having a separate reverse speed according to an exemplary embodiment of the present invention.

FIG. 8 illustrates a transmission structure in which a reverse-speed gear pair is additionally disposed according to an exemplary embodiment of the present invention. The transmission structure of FIG. 8 may correspond to a structure in which the reverse-speed gear pair is engaged and coupled to the second input shaft IP2 and the output shaft OP in FIG. 1.

The output shaft OP may include a second & reverse-speed clutch device S2&R configured for selecting the second-speed driven gear and a reverse-speed driven gear.

In the exemplary embodiment of the present invention, the reverse speed gear may be implemented while the first and second input shafts IP1 and IP2 are integrated with each other.

Figure 9:
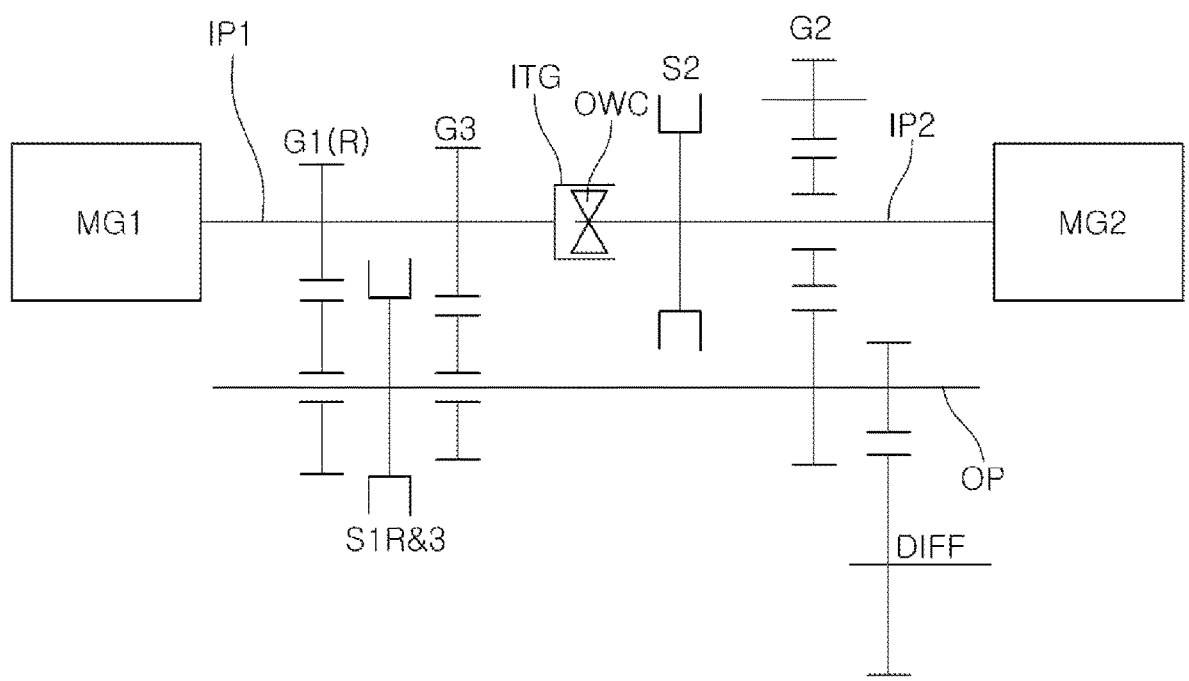
FIG. 9 and FIG. 10 illustrate the structure of a transmission in which first and second input shafts can be rotated together by a clutch device.
Figure 10:
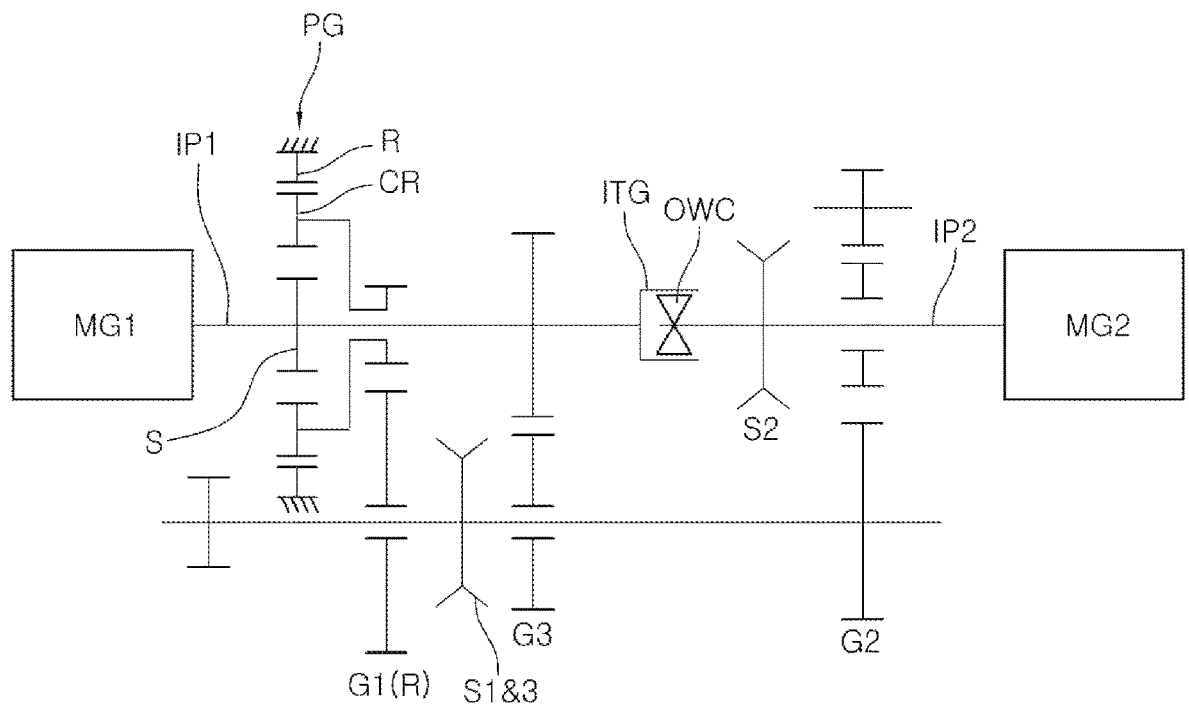

Referring to FIG. 9 and FIG. 10, an integration gear ITG may be disposed at the other end portion of the first input shaft IP1, and a clutch device may be disposed at the other end portion of the second input shaft IP2. At the present time, the clutch device may correspond to a second-speed clutch device S2 for selecting the second-speed driving gear, and the second-speed clutch device S2 may be disposed adjacent to the integration gear ITG. The second-speed clutch device S2 may be moved toward the integration gear ITG and coupled to the integration gear ITG, such that the first and second input shafts IP1 and IP2 can be rotated together.

As such, the first and second motors MG1 and MG2 may be rotated in the same direction to implement the reverse speed.

In the exemplary embodiment of the present invention, a planetary gear device PG may be used to further increase a first-speed reduction ratio.

Referring to FIG. 10, FIG. 11, and FIG. 12, the first-speed gear pair may be engaged and coupled to the first input shaft IP1 and the output shaft OP, and the planetary gear device PG may be coaxially coupled to the first input shaft IP1.

Furthermore, one rotation element among three rotation elements of the planetary gear device PG may be fixed to the first-speed driving gear, and increase a gear ratio to a higher gear ratio than the gear ratio of the first-speed gear pair.

For example, among the three rotation elements of the planetary gear device PG, a sun gear S may be coupled to the first input shaft IP1, a carrier CR may be coupled to the first-speed driving gear, and a ring gear R may be fixed to a transmission housing. Thus, since the rotation speed of the first motor MG1, inputted through the sun gear S, is reduced through the carrier CR, the first-speed reduction ratio can be increased.

In the present embodiment, the transmission may further include a controller C which turns on/off the first and second motors MG1 and MG2 and switches the rotation directions of the first and second motors MG1 and MG2 to provide a rotational force, while a current driving speed is shifted to a target driving speed during forward operation of the vehicle.

For example, when a driving speed is formed by a gear pair coupled to the first input shaft IP1 and the output shaft OP, the controller C may control the first and second motors MG1 and MG2 to be driven in the reverse direction thereof, or control the first motor MG1 to be driven in the reverse direction thereof.

Furthermore, when a driving speed is formed by the gear pair coupled to the second input shaft IP2 and the output shaft OP, the controller C may control the first and second motors MG1 and MG2 to be driven in the forward direction thereof, or control the second motor MG2 to be driven in the forward direction thereof.

Hereafter, the gear shifting process of the transmission using the controller C and a power transmission path thereof will be described.

Figure 2A:
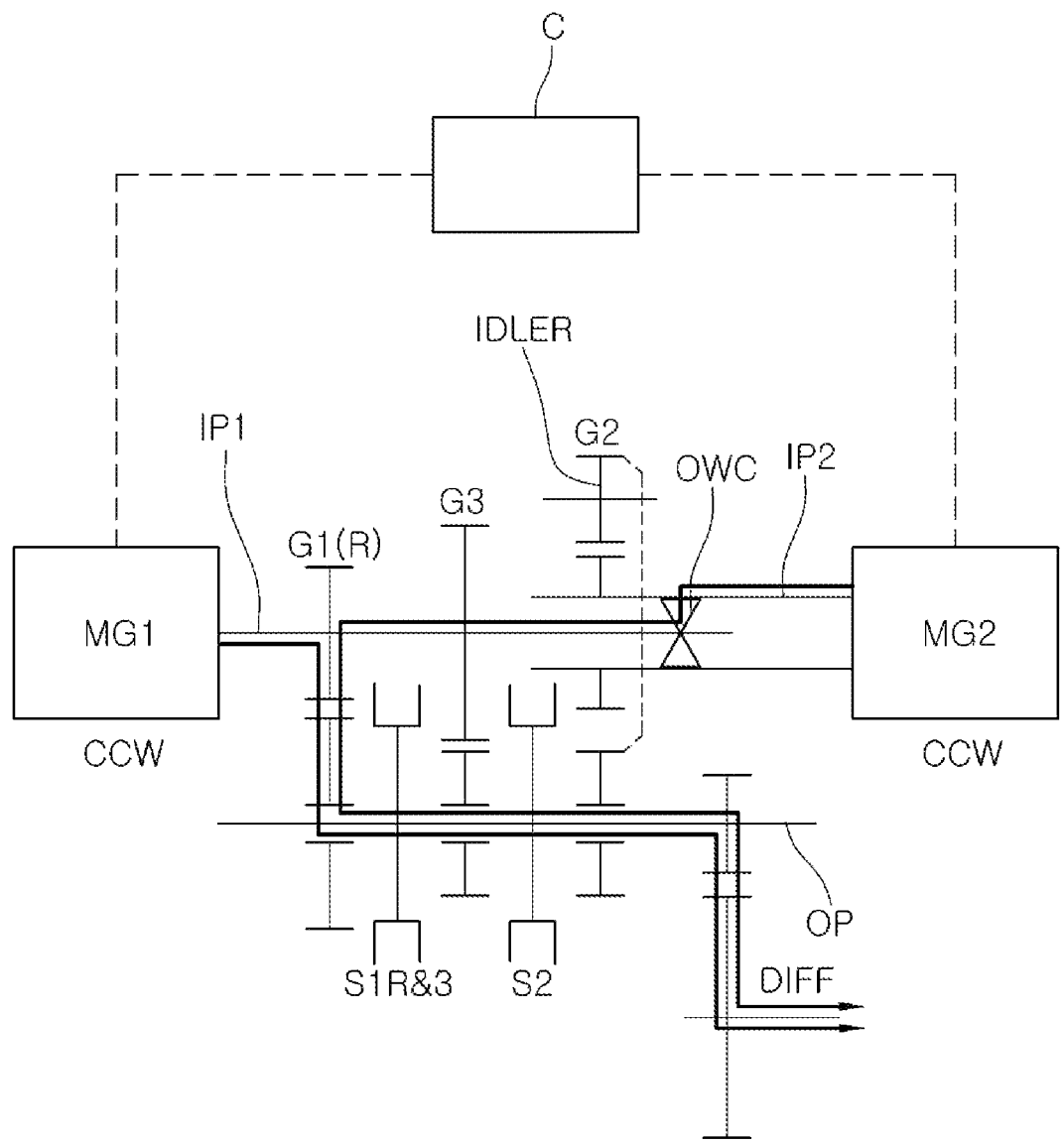

FIG. 2A, FIG. 2B, FIG. 2C, and FIG. 2D illustrate a gear shifting process from the first speed to the second speed. As illustrated in FIG. 2A, when both of the first and second motors MG1 and MG2 are driven in the counterclockwise direction while the first (reverse) & third-speed clutch device S1R&3 is coupled to the first (reverse)-speed driven gear, a rotational force of the first motor MG1 may be transferred to the output shaft OP through the first input shaft IP1 and the first-speed gear pair G1(R), and a rotational force of the second motor MG2 may be transferred to the output shaft OP through the second input shaft IP2 and the second-speed gear pair G2, such that the vehicle can be driven at the first speed by the rotational forces of the first and second motors MG1 and MG2.

In the present state, when a gear shift from the first speed to the second speed is required, the second motor MG2 is turned off, and the second-speed clutch device S2 is coupled to the second-speed driven gear as illustrated in FIG. 2B.

In the instant case, since the first motor MG1 and the first input shaft IP1 are still rotated in the counterclockwise direction thereof, the rotational force of the first motor MG1 is transferred to the second input shaft IP2 through the second-speed clutch device S2 and the second-speed gear pair, and the second input shaft IP2 is rotated. However, since the second input shaft IP2 is rotated in the clockwise direction thereof, a difference between the rotation directions is allowed by the one-way clutch OWC, such that the second input shaft IP2 and the first input shaft IP1 can be rotated independently of each other.

In the present state, when the first motor MG1 is turned off while the second motor MG2 is rotated in the clockwise direction as illustrated in FIG. 2C, the rotational force of the second motor MG2 may be transferred to the output shaft OP through the second-speed gear pair G2 and the idler gear IDLER, such that the vehicle can be driven at the second speed. Since the rotational force of the second motor MG2 is transferred to the output shaft OP during the gear shifting process from the first speed to the second speed, a torque interruption feel can be removed.

Figure 2D:
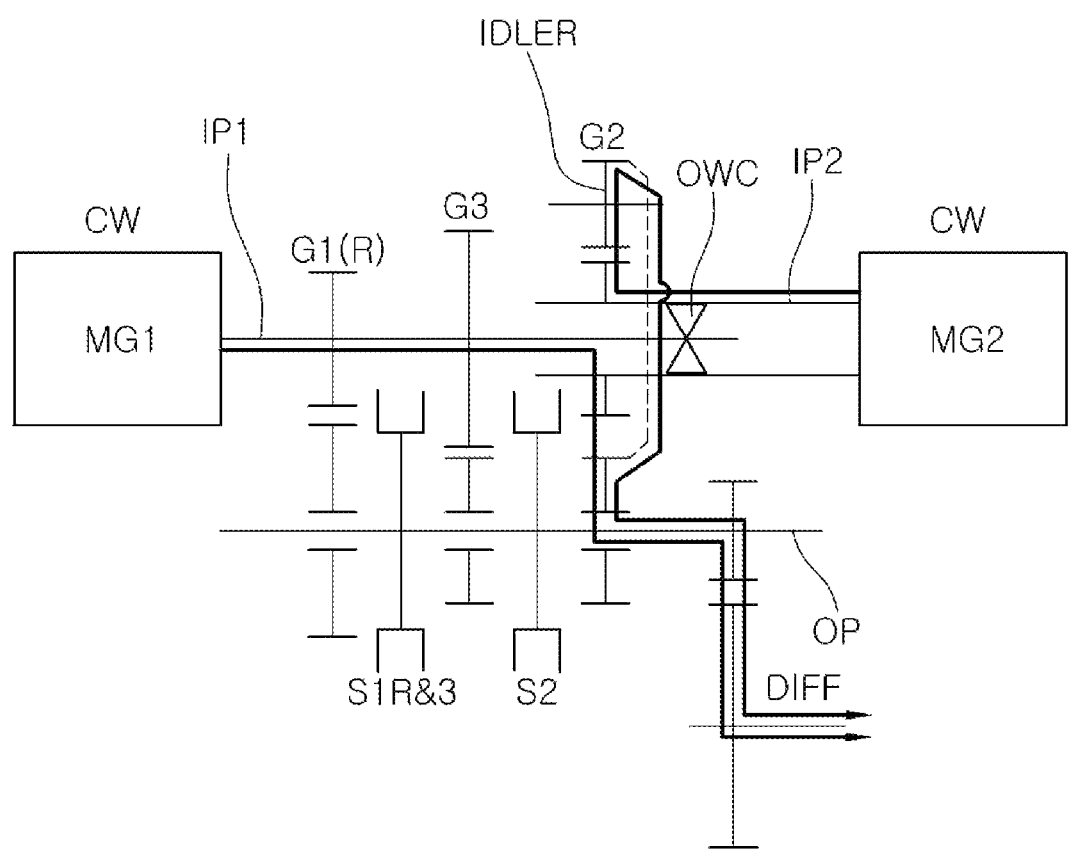

As such, when the first (reverse) & third-speed clutch device S1R&3 is released and the first motor MG1 is rotated in the clockwise direction as illustrated in FIG. 2D, the rotational force of the first motor MG1 is transferred to the second input shaft IP2 by the one-way clutch OWC. Thus, the vehicle can be driven at the second speed by the rotational forces of the first and second motors MG1 and MG2.

Figure 3A:
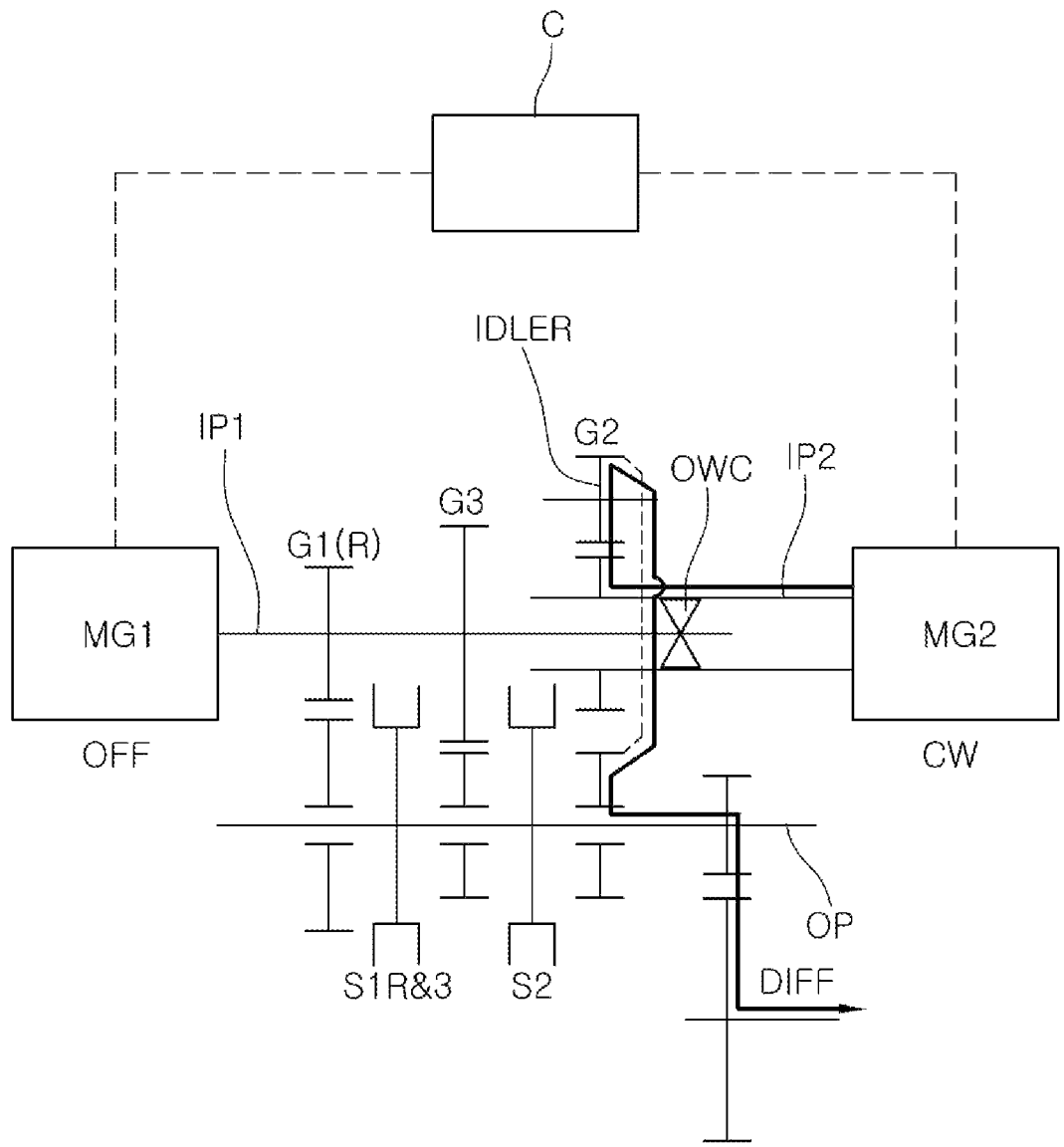
FIG. 3A, FIG. 3B, and FIG. 3C illustrates a gear shifting process from the second speed to a third speed using the transmission of FIG. 1 and a power flow during the gear shifting process.
Figure 3B:
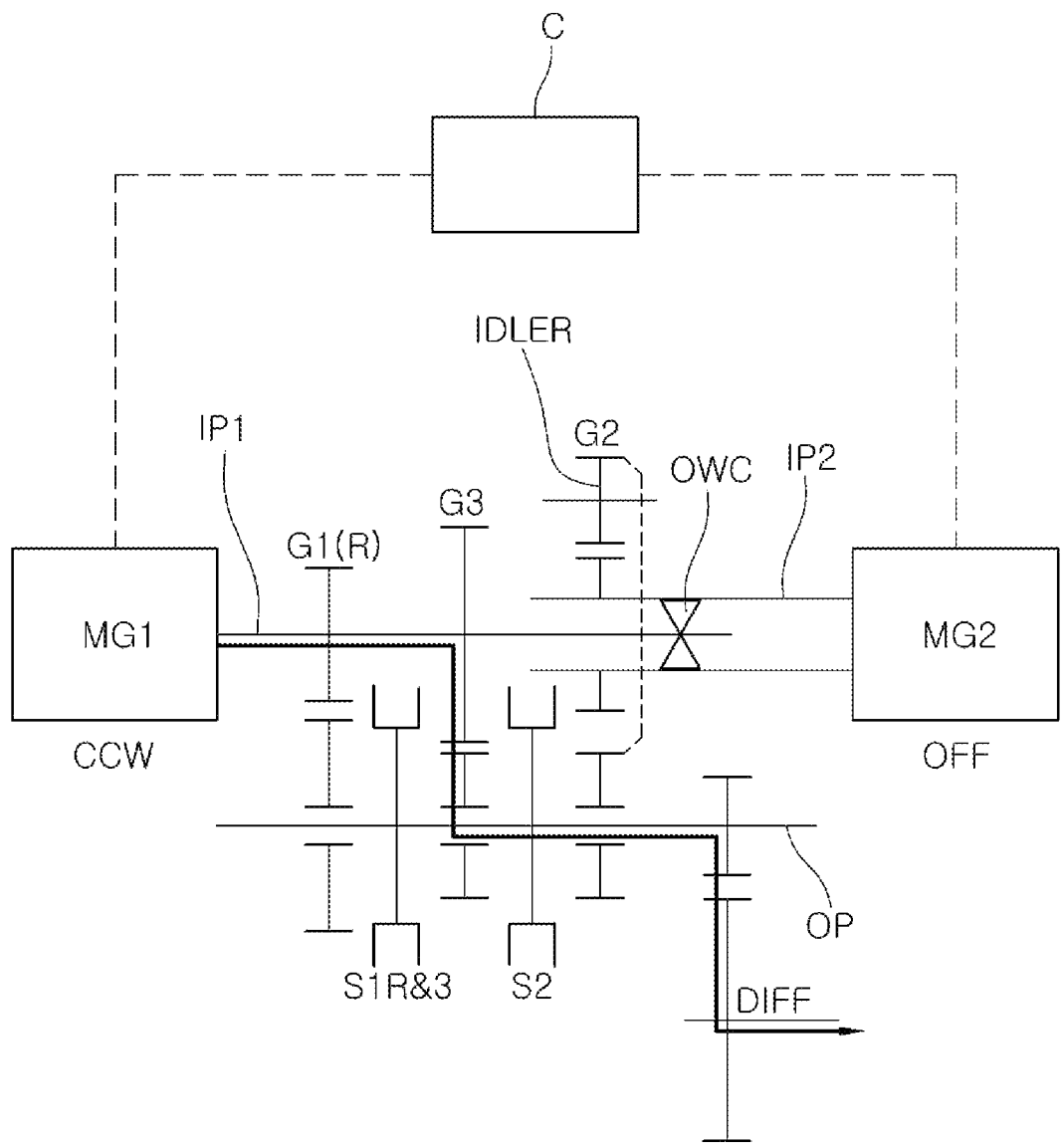
Figure 3C:
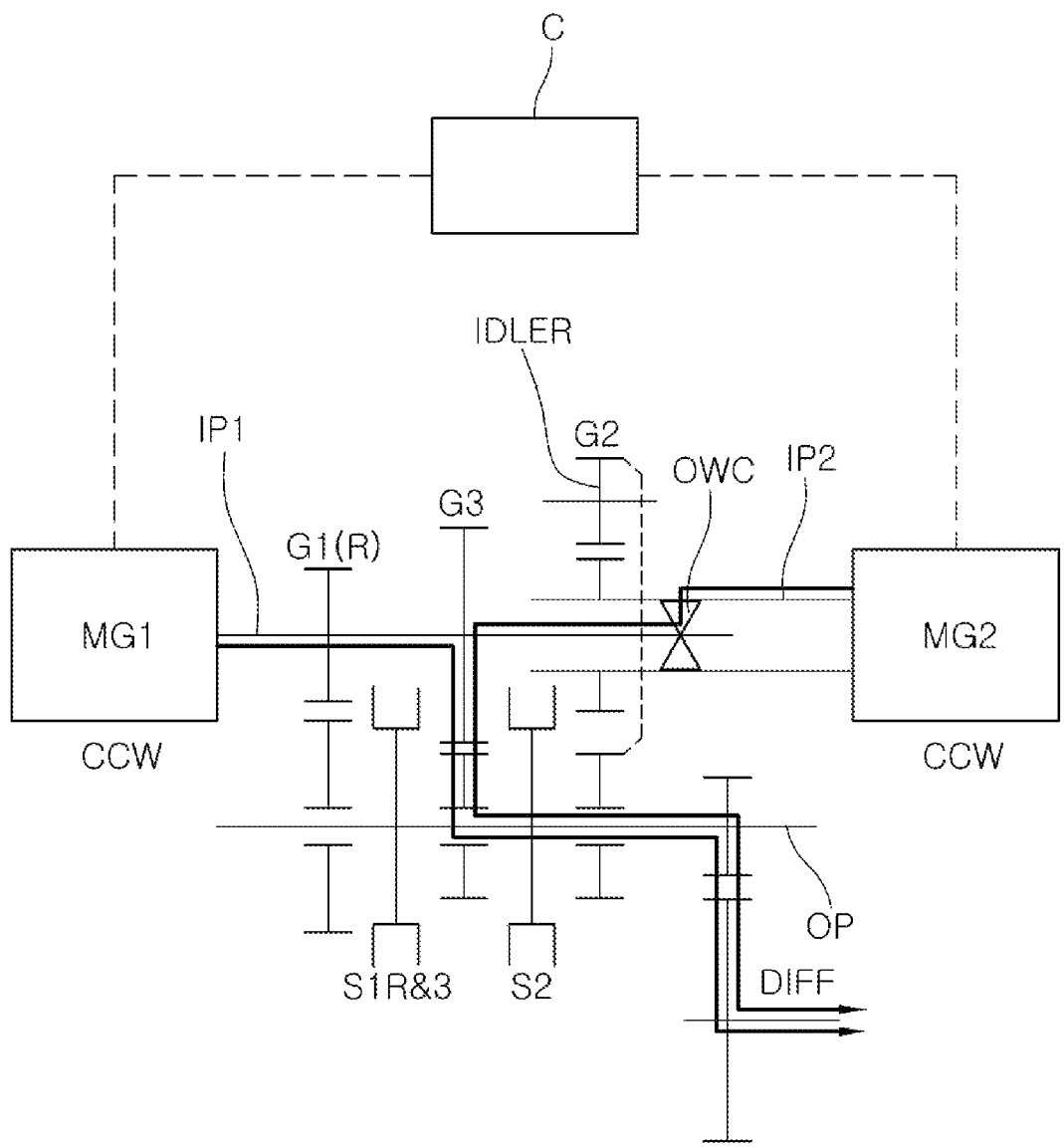

FIG. 3A, FIG. 3B and FIG. 3C illustrate a gear shifting process from the second speed to the third speed. When a gear shift from the second speed to the third speed is required while the vehicle is driven at the second speed as illustrated in FIG. 2D, the first motor MG1 is turned off, and the first (reverse) & third-speed clutch device S1R&3 is coupled to the third-speed driven gear as illustrated in FIG. 3A.

In the instant case, since the second motor MG2 and the second input shaft IP2 are still rotated in the clockwise direction thereof, the rotational force of the second motor MG2 is transferred to the first input shaft IP1 through the first (reverse) & third-speed clutch device S1R&3 and the third-speed gear pair G3, and the first input shaft IP1 is rotated. However, since the first input shaft IP1 is rotated in the counterclockwise direction thereof, a difference between the rotation directions is allowed by the one-way clutch OWC, such that the first and second input shafts IP1 and IP2 can be rotated independently of each other.

In the present state, when the second motor MG2 is turned off while the first motor MG1 is rotated in the counterclockwise direction as illustrated in FIG. 3B, the rotational force of the first motor MG1 may be transferred to the output shaft OP through the third-speed gear pair G3, such that the vehicle can be driven at the third speed. Since the rotational force of the first motor MG1 is transferred to the output shaft OP during the gear shifting process from the first speed to the second speed, a torque interruption feel can be removed.

As such, when the second-speed clutch device S2 is released and the second motor MG2 is rotated in the counterclockwise direction as illustrated in FIG. 3C, the rotational force of the second motor MG2 is transferred to the first input shaft IP1 by the one-way clutch OWC. Thus, the vehicle can be driven at the third speed by the rotational forces of the first and second motors MG1 and MG2.

As described above, the transmission according to the exemplary embodiment of the present invention can control the two bidirectionally rotatable electric motors to properly change the directions depending on a driving condition of the vehicle during a gear shifting process of the vehicle, a shifting interruption feel can be removed without an addition of a separate device.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a vehicle, comprising:
   a first input shaft receiving a rotational force from a first motor;
   a second input shaft receiving a rotational force from a second motor;
   a one-way clutch mounted between the first and second input shafts, transferring only a forward rotation of the first input shaft to the second input shaft, and transferring only a reverse rotation of the second input shaft to the first input shaft;
   an output shaft disposed in parallel to the first and second shafts;
   a gear shifting device having a first gear pair coupled to the first input shaft and the output shaft and a second gear pair coupled to the second input shaft and the output shaft, wherein the first and second gear pairs have different shift ratios, and at least one of the first and second gear pairs, which corresponds to a driving speed is selected by a clutch device; and an idler gear engaged and coupled between gears of the second gear pair coupled to the second input shaft and the output shaft.

2. The transmission of claim 1, wherein the first motor is fixedly connected to a first end portion of the first input shaft, the second motor is fixedly connected to a first end portion of the second input shaft, the one-way clutch is disposed between a second end portion of the first input shaft and a second end portion of the second input shaft, and the first and second input shafts are coaxially disposed.

3. The transmission of claim 2, wherein the first input shaft is formed as a solid shaft and the second input shaft is formed as a hollow shaft, and wherein the first input shaft is configured to be inserted into the second input shaft.

4. The transmission of claim 1, wherein the first gear pair forms an odd-numbered gear pair and the second gear pair forms an even-numbered gear pair, and wherein a third gear pair between the odd-numbered gear pair and the even-numbered gear pair is engaged and coupled to the first input shaft and the output shaft, and wherein the second gear pair which is not engaged with the first input shaft and the output shaft, between the odd-numbered gear pair and the even-numbered gear pair, is coupled to the second input shaft and the output shaft.

5. The transmission of claim 4, wherein the odd-numbered gear pair is a first-speed gear pair which is engaged and coupled to the first input shaft and the output shaft, and commonly used as a reverse-speed gear pair.

6. The transmission of claim 4, wherein the even-numbered gear pair is a second-speed gear pair which is engaged and coupled to the second input shaft and the output shaft.

7. The transmission of claim 4, wherein the third gear pair is an odd-numbered gear pair which is engaged and coupled to the first input shaft and the output shaft, to form a third-speed gear pair.

8. The transmission of claim 5, wherein an integration gear is disposed at a second end portion of the first input shaft, and the clutch device is disposed at a second end portion of the second input shaft, and coupled to the integration gear.

9. The transmission of claim 4, wherein the odd-numbered gear pair is a first-speed gear pair which is engaged and coupled to the first input shaft and the output shaft, a planetary gear device is coaxially coupled to the first input shaft, and one rotation element among three rotation elements having first, second, and third rotation elements of the planetary gear device is fixed to a first-speed driving gear of the first-speed gear pair, and increases a gear ratio to a higher ratio than a gear ratio of the first-speed gear pair.

10. The transmission of claim 4, wherein the odd-numbered gear pair is a first-speed gear pair which is engaged and coupled to the first input shaft and the output shaft, a planetary gear device including first, second, and third rotation elements is coaxially coupled to the first input shaft, and the first rotation element of the planetary gear device is fixed to a first-speed driving gear of the first-speed gear pair, the second rotation element of the planetary gear device is fixed to the first input shaft, and the third rotation element of the planetary gear device is fixed to a transmission housing.

11. The transmission of claim 1, further including a controller configured to turn on/off the first and second motors and switch rotation directions of the first and second motors to provide the rotational force, while a current driving speed is shifted to a target driving speed during a forward operation of the vehicle.

12. The transmission of claim 11, wherein the controller is configured to control the first and second motors to be driven in a reverse direction or is configured to control first motor to be driven in the reverse direction thereof, when the driving speed is formed by the first gear pair coupled to the first input shaft and the output shaft, and is configured to control the first and second motors to be driven in a forward direction or is configured to control the second motor to be driven in a forward direction thereof, when the driving speed is formed by the second gear pair coupled to the second input shaft and the output shaft.

13. The transmission of claim 1, wherein the clutch device includes a synchro-mechanism.

* * * * *